United States Patent
Goetzinger et al.

(10) Patent No.: US 7,254,944 B1
(45) Date of Patent: Aug. 14, 2007

(54) ENERGY STORAGE SYSTEM

(75) Inventors: Steven J Goetzinger, Oklahoma City, OK (US); Terry L Brittenham, Oklahoma City, OK (US); David W. Watson, Oklahoma City, OK (US); Md L Alam, Oklahoma City, OK (US)

(73) Assignee: Ventoso Systems, LLC, Oklahoma City, OK (US)

( * ) Notice: Subject to any disclaimer, the term of this patent is extended or adjusted under 35 U.S.C. 154(b) by 0 days.

(21) Appl. No.: 11/162,941

(22) Filed: Sep. 28, 2005

Related U.S. Application Data

(60) Provisional application No. 60/522,425, filed on Sep. 29, 2004.

(51) Int. Cl.
*F03D 9/00* (2006.01)
*F16D 31/02* (2006.01)

(52) U.S. Cl. .......................... 60/398; 290/55
(58) Field of Classification Search ................. 60/398; 290/43, 44, 54, 55
See application file for complete search history.

(56) References Cited

U.S. PATENT DOCUMENTS

| | | | |
|---|---|---|---|
| 1,006,912 A | 10/1911 | Cook | |
| 2,454,058 A | 11/1948 | Hays | |
| 3,523,192 A | 8/1970 | Lang | |
| 3,538,340 A | 11/1970 | Lang | |
| 3,939,356 A * | 2/1976 | Loane | 60/398 |
| 3,996,741 A | 12/1976 | Herberg | 60/398 |
| 4,896,507 A * | 1/1990 | Hosford | 60/698 |
| 5,685,155 A | 11/1997 | Brown et al. | 60/698 |
| 6,155,047 A | 12/2000 | Streetman | 60/398 |
| 6,537,018 B2 * | 3/2003 | Streetman | 290/44 |

OTHER PUBLICATIONS

Ball et al., Petroleum Geology of the Anadarko Basin Region, Province (115), Kansas, Oklahoma, and Texas, pp. 1 and 2, 1991, U.S. Geological Survey, USA.
U.S. Department of Energy et al., Renewable Energy Technology Characterizations, pp. 6-1 through 6-6, Dec. 1997, U.S. Department of Energy, USA.

* cited by examiner

*Primary Examiner*—Michael Leslie
(74) *Attorney, Agent, or Firm*—Gary Peterson

(57) ABSTRACT

An energy storage system in which a renewable power production facility, such as one having a wind energy collector, is used to power a compressor situated adjacent a wellbore. During periods of non-peak load on the electric power grid, the compressor is used to compress atmospheric gases and transfer these gases to a subterranean zone, where the gases are stored. During peak load periods, pressurized gases are allowed to flow from the subterranean zone, through the wellbore and to the surface. At the surface, the gases may be processed to remove residual hydrocarbons, and heated. Heat may be provided by combustion of the hydrogen output of an electrolyzer. The gases are then used to power a electric power production device which delivers alternating current to the power grid.

21 Claims, 3 Drawing Sheets

ENERGY STORAGE SYSTEM

CROSS REFERENCE TO RELATED APPLICATION

This application claims the benefit of the filing date of U.S. Provisional Patent Application Ser. No. 60/522,425, filed Sep. 29, 2004, the entire disclosure of which is incorporated by reference.

DETAILED DESCRIPTION

Figure 1:
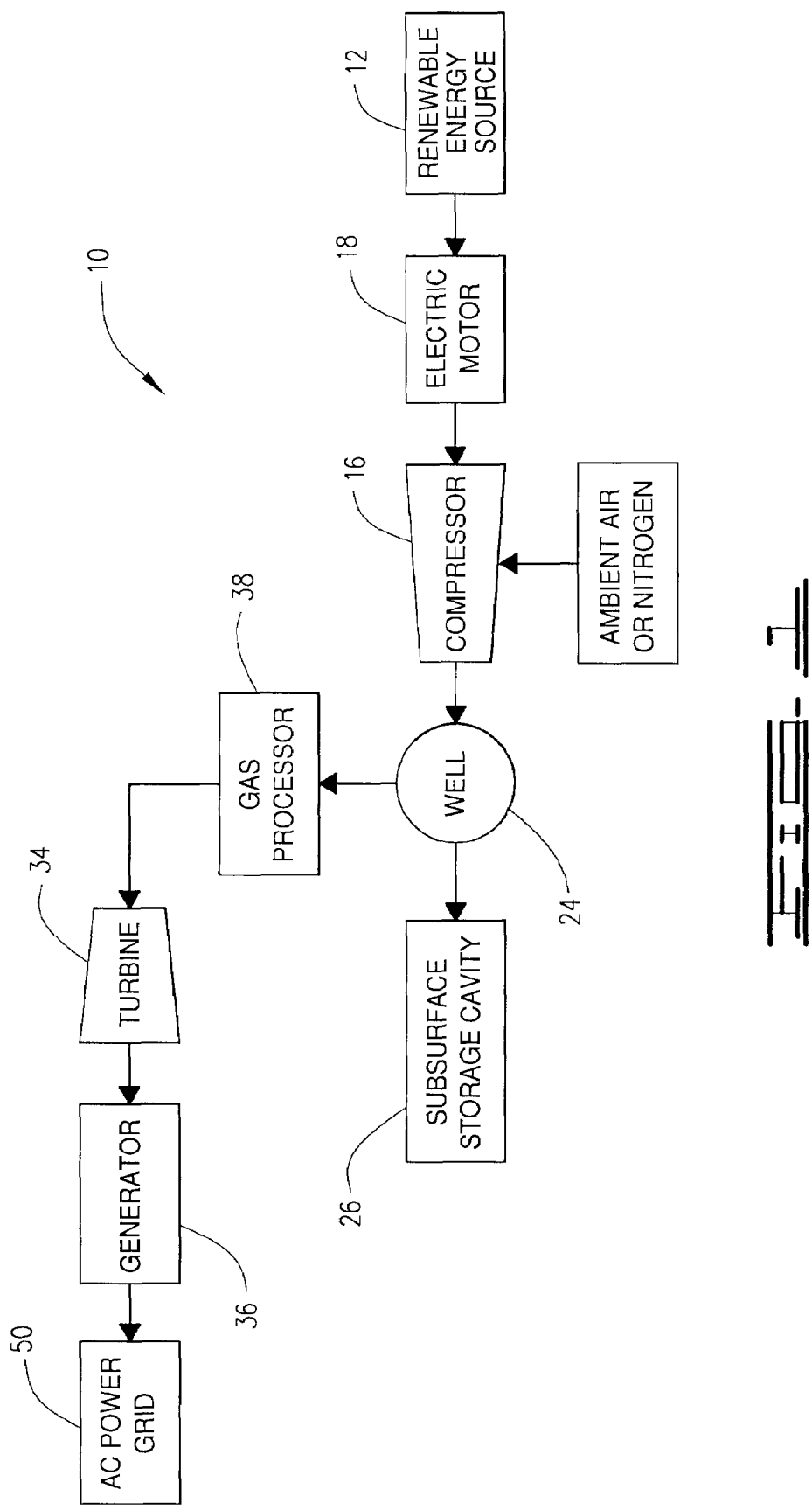
FIG. 1 is a flow chart illustrating the system of the present invention.
Figure 3:
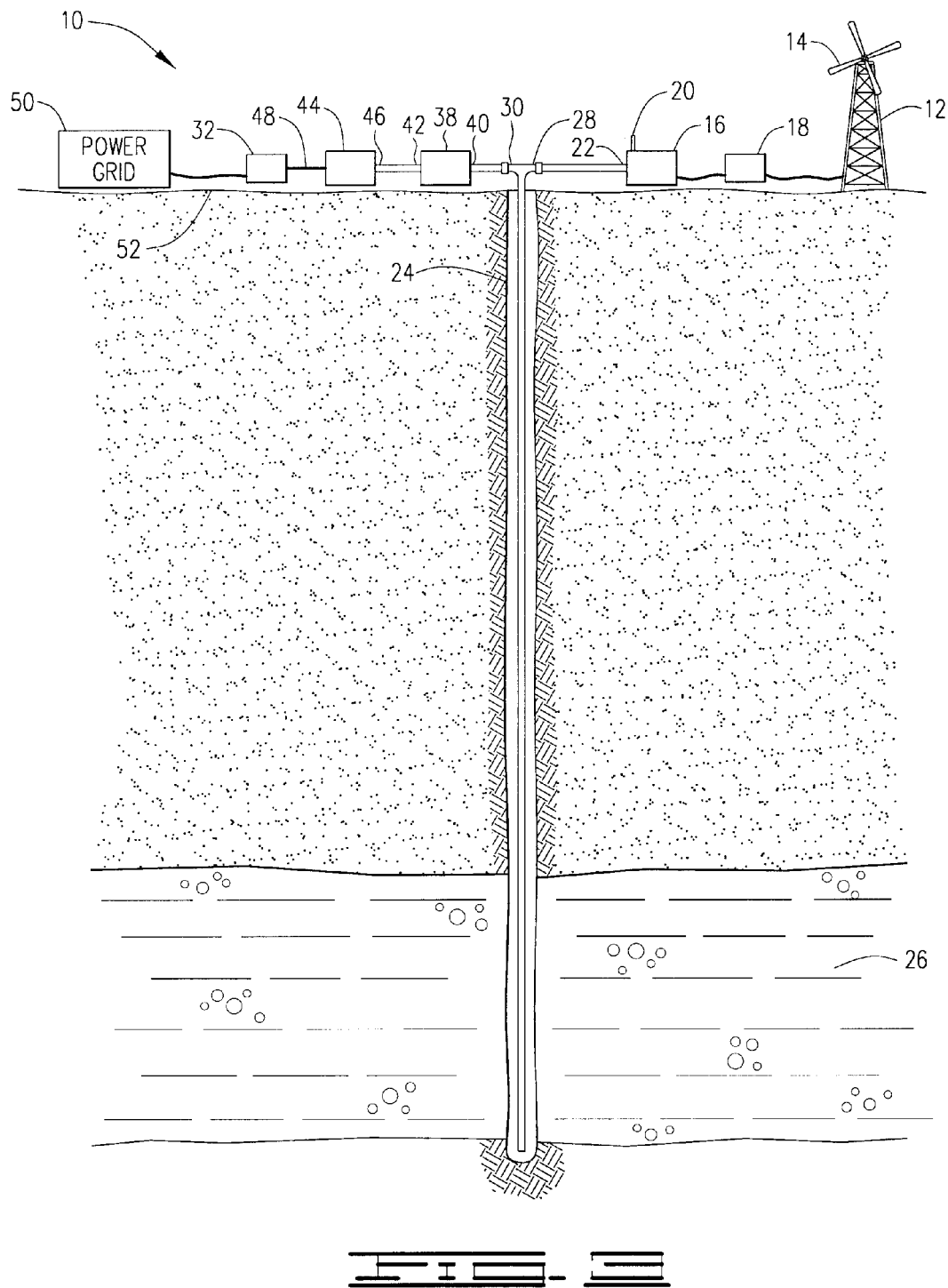
FIG. 3 is a semi-schematic elevational view of the system shown in FIG. 2. Subsurface features are shown in cross-section.

With reference to FIG. 1, the present invention comprises an energy storage system, generally designated by reference numeral 10. The system 10 comprises a renewable power production facility 12, which comprises at least one collector 14 and a device for generating electricity, such as a wind turbine, operatively engaged to the collector 14. The collector 14 may comprise a wind energy collector, as shown in FIG. 3, a collector for solar energy, wave energy, or any other renewable power source, or a combination of such collectors. In some embodiments of the invention, a plurality of collectors 14 may be provided, each operatively engaged to one or more devices for generating electricity.

The system 10 further comprises a compressor 16 which is driven by a motor 18. The motor 18 is in turn preferably powered by the output of the renewable power production facility 12, which is typically electricity. The compressor 16 is characterized by a gas inlet 20 (shown in FIG. 3) disposed in fluid communication with a supply of atmospheric gases, and a gas outlet 22. The atmospheric gases may consist of ambient air, or they may instead consist of nitrogen stripped from ambient air. The compressor is adapted to compress the atmospheric gases to a high pressure, such as between about 500 and about 1,000 pounds per square inch, and to transfer and inject these gases as described hereafter.

The system 10 further comprises at least one wellbore 24 providing fluid access to a subterranean zone 26 that can function as a subsurface storage cavity. In one embodiment of the present invention, the wellbore 24 is that of a non-producing hydrocarbon well, such as a gas well, and the subterranean zone 26 is a hydrocarbon-depleted zone suitable for pressurized gas storage. In order to minimize energy losses associated with transmission of gases to and from the subterranean zone 26, that zone is preferably relatively shallow, with a depth of about 6000 feet or less preferred. The wellbore 24 is characterized by a gas inlet port 28 in fluid communication with the gas outlet 22 of compressor 16, and a gas outlet port 30. Fluid flow between the compressor 16 and wellbore 24 is controlled by one or more valves. The compressor 18 is adapted to transfer and inject these pressurized gases though the wellbore 24 and into the subterranean zone 26. In another embodiment of the invention, a plurality of wellbores may be provided, with each additional wellbore providing access to the same subterranean zone that can function as a subsurface storage cavity, or to a plurality of such subterranean zones.

The system 10 preferably further comprises an electric power production device 32 which is drivable by the energy of pressurized gases received directly or indirectly from the subterranean zone 26 by way of the wellbore 24. The electric power production device 32 is preferably situated on the surface 52 of the terrain on which the wellbore 24 is situated.

In the embodiment shown in FIG. 1, the electric power production device 32 comprises a turbine 34, which is drivable by flow of the pressurized gases, and an electric power generator 36 operatively engaged with the turbine 34. Fluid flow between the turbine 34 and the wellbore 24 is controlled by one or more valves. The electric power production device 32 is operatively connected by conductors to the electric power grid 50, in order to supply alternating current thereto.

Particularly when the wellbore 24 is that of a hydrocarbon well, whether producing or non-producing, gases that are transferred from subterranean zone 26 may include hydrocarbons, such as natural gas, in addition to the compressed atmospheric gases that have been injected by compressor 16. Preferably, such hydrocarbons are separated from the pressurized gases at a stage prior to their flow to the electric power production device 32. Such separation is preferably carried out by a gas processor 38 having an inlet port 40 in fluid communication with the gas outlet port 30 of the wellbore 24, and an outlet port 42 in fluid communication with the electric power production device 32. The gas processor 38 is preferably situated at the surface 52 of the terrain on which the wellbore 24 is situated, in a processing zone.

In operation of the system 10, compressor 16 is preferably operated during times of off-peak demand on the alternating current power grid 50, preferably using electrical energy produced by the renewable power production facility 12. The compressor 16 is supplied with atmospheric gases through gas inlet 20, and these gases are compressed to high pressure and injected into gas inlet port 28 of the wellbore 24. The pressurized gases flow under pressure to subterranean zone 26, where they are stored.

During times of peak load demand on the alternating current power grid 50, the stored pressurized gases are allowed to flow from the subterranean zone 26, through the wellbore 24 and to the surface 52. At the surface 52, these gases are used to power electric power production device 32. Device 32 in turn delivers generated electric power to the grid 50. Preferably, as discussed above, the pressurized gases are processed in gas processor 38, to separate and remove any hydrocarbons therein, prior to their flow to the electric power production device 32.

Figure 2:
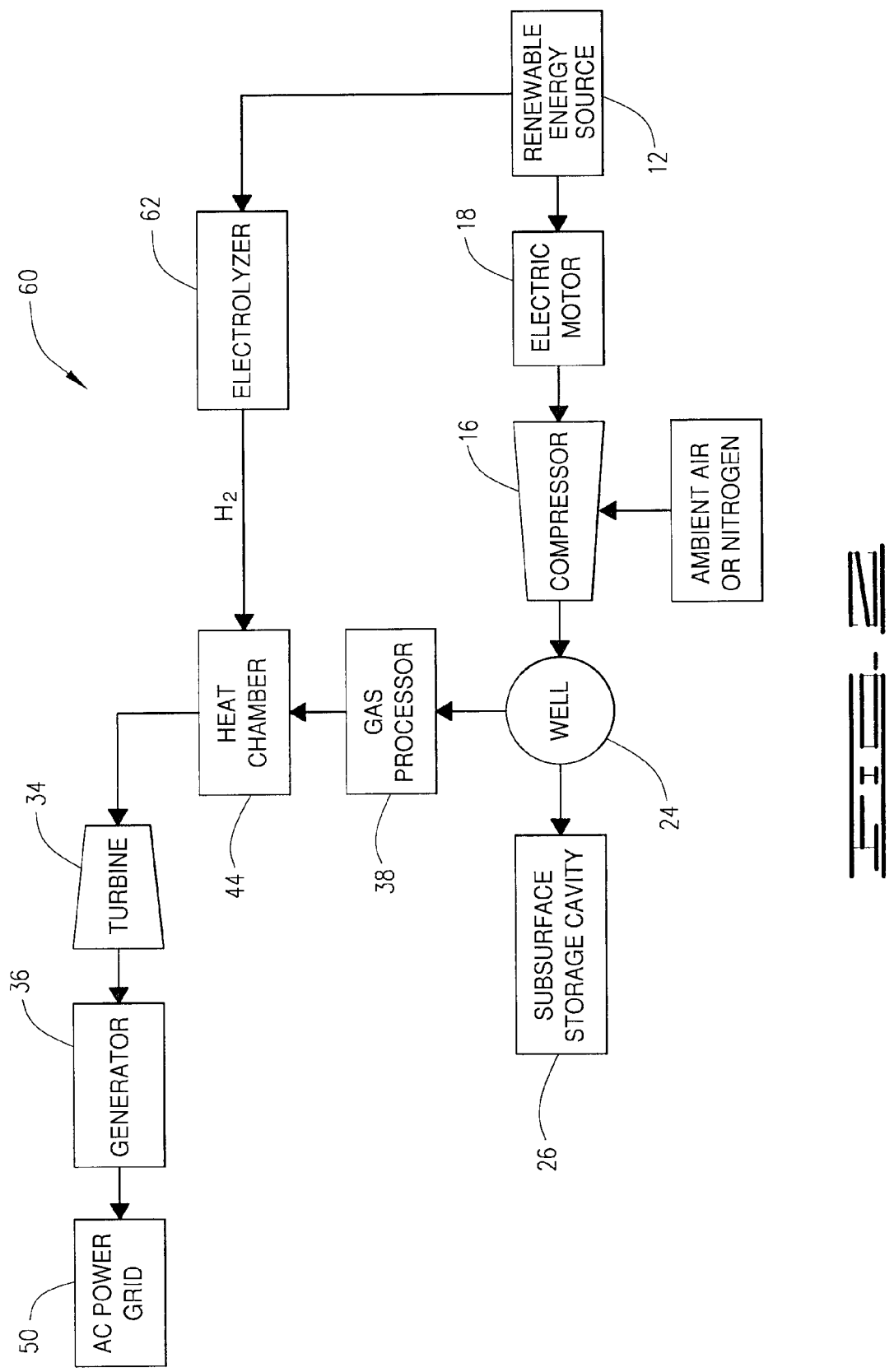
FIG. 2 is a flow chart illustrating another embodiment of the system of the present invention.

FIG. 2 shows an another embodiment of the system of the present invention, generally designated by reference numeral 60. The system 60 includes the same renewable power production facility 12, compressor 18, motor 16, wellbore 24, subterranean zone 26, turbine 34, generator 36 and gas processor 38 described with reference to FIG. 1. As with the embodiment of FIG. 1, the generator 36 is operatively connected to supply alternating current to electric power grid 50.

In order to enhance the expansion work that may be done by pressurized gases that have been stored in subterranean zone 26, the system 60 preferably further comprises a gas heater 44 adapted to heat pressurized gases received from subterranean zone 26 prior to their flow to electric power production device 32. The gas heater 44 preferably comprises a heat chamber and is characterized by an inlet port 46 disposed in fluid communication with the gas outlet port 30 of the wellbore 24, and an outlet port 48 disposed in fluid communication with the electric power production device 32. The gas heater increases the gas temperature by as much as between about 500 degrees F. and about 1,800 degrees F., depending on the metallurgical limits of turbine 34.

Preferably, as shown in FIG. 2, the inlet port 46 of the gas heater 44 is situated immediately downstream from the gas processor 38 and in fluid communication therewith. The outlet port of the 48 of the gas heater 44 is in turn situated immediately downstream from the electric power production device 32. The gas heater 44 is preferably situated in a processing zone at the surface 52 of the terrain on which the wellbore 24 is situated.

With continued reference to FIG. 2, in one embodiment of the system 60, the gas heater 44 provides heat by combusting the hydrogen produced by a water electrolyzer 62. The electrolyzer 62 is in turn preferably powered by the renewable power production facility 12.

System 60 operates in substantially the same manner as system 10, except that gas heater 44 increases the temperature of the pressurized gases delivered from the subterranean zone 26. This temperature increase enhances the expansion work that these gases may perform in the turbine 34 of electric power production device 32.

In order to minimize energy losses, the renewable power production facility 12, compressor 16 and motor 18 are each preferably located in close proximity to the wellbore 24. The gas processor 38, gas heater 44 and electric power production device 32 are likewise each preferably located in close proximity to the wellbore 24. In one embodiment of the invention, these components of systems 10 and/or 60 are collocated on a single real property tract in which each estate thereof, whether mineral or surface, has uniform ownership throughout. Such uniform ownership can facilitate acquisition of the property rights needed for placement of the system.

When the renewable power production facility 12 includes a wind energy collector 14, higher power production can be achieved by placing the renewable power production facility 12, and preferably the entire system, at a location characterized by high average wind speed. One area where high average wind speeds are encountered is the natural gas-producing Anadarko Basin area of western Oklahoma and the Texas panhandle. This geographical area is also dotted with non-producing gas wells which access hydrocarbon-depleted subterranean gas zones that are suitable for storage of pressurized gases in accordance with the present invention. Such an area, characterized by both high average wind speed and a plentitude of non-producing gas wells, is well adapted for placement and operation of the system of the present invention.

In accordance with the present invention, a wind energy collector may be positioned by locating an area of high wind speed situated within a natural gas producing region. Within the area of high wind speed, a non-producing hydrocarbon well, and preferably a non-producing natural gas well, is located. The located well must have wellbore that accesses a hydrocarbon-depleted subterranean zone suitable for storage of compressed atmospheric gases. The wind energy collector is then positioned on a site adjacent the wellbore.

After the wind energy collector has been located as described above, other components of the system of the present invention, such as a compressor, motor, gas processor, gas heater, electrolyzer and electric power production device may be positioned. Preferably, each of these components is positioned adjacent one another and the wellbore. The wellbore and each of the other components of the system are preferably collocated on a single real property tract in which each estate thereof, whether mineral or surface, has uniform ownership throughout.

Changes may be made in the construction, operation and arrangement of the various parts, elements, steps and procedures described herein without departing from the spirit and scope of the invention as defined in the following claims.

What is claimed is:

1. A system comprising:
    a renewable power production facility;
    a wellbore of a non-producing hydrocarbon well providing fluid access to a subterranean zone, the wellbore having a gas inlet port and a gas outlet port;
    a compressor powered by the output of the renewable power production facility and disposed in fluid communication with the gas inlet port of the wellbore, the compressor adapted to compress and transfer atmospheric gases through the wellbore and into the subterranean zone;
    a gas heater situated in a processing zone, disposed in fluid communication with the gas outlet port of the wellbore and adapted to heat gases transferred from the subterranean zone;
    an electric power production device, drivable by the energy of heated gases from the subterranean zone; and
    a gas processor adapted to remove hydrocarbons from pressurized gases transferred from the subterranean zone, the processor having an inlet port in fluid communication with the gas outlet port of the wellbore, and an outlet port in fluid communication with the gas heater.

2. The system of claim 1 in which the renewable power production facility comprises a wind energy collector.

3. The system of claim 1 in which the gas heater provides heat by combustion of the hydrogen output of a water electrolyzer.

4. The system of claim 3 in which the electrolyzer is powered by electric power generated from the renewable power production facility.

5. The system of claim 1 in which the wellbore and the renewable power production facility are collocated on a real property tract in which each estate thereof, whether mineral or surface, has uniform ownership throughout.

6. A system comprising:
    a renewable power production facility;
    a wellbore of a non-producing hydrocarbon well, the wellbore providing fluid access to a subterranean zone, the wellbore having a gas inlet port and a gas outlet port;
    a compressor powered by the output of the renewable power production facility and disposed in fluid communication with the gas inlet port of the wellbore, the compressor adapted to compress and transfer atmospheric gases through the wellbore and into the subterranean zone;
    a gas processor adapted to remove hydrocarbons from pressurized gases transferred from the subterranean zone, the processor having an inlet port in fluid communication with the gas outlet port of the wellbore, and an outlet port;
    an electric power production device, drivable by the energy of processed pressurized gases from the subterranean zone.

7. The system of claim 6 in which the renewable power production facility comprises a wind energy collector.

8. The system of claim 6 in which the wellbore and the renewable power production facility are collocated on a real property tract in which each estate thereof, whether mineral or surface, has uniform ownership throughout.

9. A method of positioning a wind energy collector, comprising:
locating an area of high average wind speed within a natural gas producing region;
locating, within the area of high average wind speed, a non-producing hydrocarbon well having a wellbore that provides fluid access to a hydrocarbon-depleted subterranean zone;
positioning a wind energy collector at a site adjacent the wellbore of the well;
positioning a compressor adjacent to and in communication with the wellbore, the compressor powered by the output of the wind energy collector and adapted to compress atmospheric gases and transfer these gases through the wellbore for storage in the subterranean zone;
positioning an electric power generating device adjacent to the wellbore, the device powered by the flow of pressurized gases delivered from storage in the subterranean zone; and
positioning a gas heater adjacent the wellbore, the gas heater adapted to heat pressurized gases prior to delivery to the electric power generating device and powered by combustion of the hydrogen output of a water electrolyzer.

10. The method of claim 9 in which the non-producing hydrocarbon well and the wind energy collector are collocated on a real property tract in which each estate thereof, whether mineral or surface, has uniform ownership throughout.

11. The method of claim 9 in which the electrolyzer is powered by the output of the wind energy collector.

12. The method of claim 9 further comprising:
positioning a gas processor adjacent the wellbore, the gas processor adapted to remove hydrocarbons from the pressurized gases prior to their delivery to the electric power generating device.

13. The method of claim 9 in which the average wind speed at the area is sufficiently high to generate usable energy from the wind energy collector.

14. The method of claim 9 in which the area of high average wind speed is the natural gas-producing Anadarko Basin area of western Oklahoma and the Texas panhandle.

15. A method of processing atmospheric gases, comprising:
generating power with a renewable power source;
compressing atmospheric gases with the output of the renewable power source;
transferring pressurized atmospheric gases to a subterranean zone, for storage under pressure;
delivering gases from the subterranean zone to a processing zone;
heating the delivered pressurized gases in the processing zone by combustion of the hydrogen output of a water electrolyzer;
generating electric power from the heated and pressurized gases.

16. The method of claim 15 in which the renewable power source comprises ambient wind.

17. The method of claim 15 in which the electrolyzer is powered by output of the renewable power source.

18. A method of processing atmospheric gases, comprising:
generating power with a renewable power source;
compressing atmospheric gases with the output of the renewable power source;
transferring pressurized atmospheric gases through a wellbore of a non-producing hydrocarbon well to a subterranean zone, for storage under pressure;
delivering gases from the subterranean zone to a processing zone;
removing hydrocarbons from pressurized gases in the processing zone;
generating electric power from the heated and pressurized gases.

19. The method of claim 18 in which the renewable power source comprises ambient wind.

20. The method of claim 18 further comprising:
heating the pressurized gases after hydrocarbon removal in the processing zone.

21. A method of positioning a wind energy collector, comprising:
locating an area of high average wind speed within a natural gas producing region;
locating, within the area of high average wind speed, a non-producing hydrocarbon well having a wellbore that provides fluid access to a hydrocarbon-depleted subterranean zone;
positioning a wind energy collector at a site adjacent the wellbore of the well;
positioning a compressor adjacent to and in communication with the wellbore, the compressor powered by the output of the wind energy collector and adapted to compress atmospheric gases and transfer these gases through the wellbore for storage in the subterranean zone;
positioning an electric power generating device adjacent to the wellbore, the device powered by the flow of pressurized gases delivered from storage in the subterranean zone; and
positioning a gas processor adjacent the wellbore, the gas processor adapted to remove hydrocarbons from the pressurized gases prior to their delivery to the electric power generating device.

* * * * *

UNITED STATES PATENT AND TRADEMARK OFFICE
CERTIFICATE OF CORRECTION

PATENT NO. : 7,254,944 B1
APPLICATION NO. : 11/162941
DATED : August 14, 2007
INVENTOR(S) : Steven J. Goetzinger et al.

It is certified that error appears in the above-identified patent and that said Letters Patent is hereby corrected as shown below:

Title page, item 75 left column, "David W. Watson" should be --W. David Watson--.

Title page, item 75 left column, "Md L Alam" should be --Md K. Alam--.

Signed and Sealed this

Eighteenth Day of December, 2007

JON W. DUDAS
*Director of the United States Patent and Trademark Office*